United States Patent Office 3,417,131
Patented Dec. 17, 1968

3,417,131
METHOD FOR THE PREPARATION OF HYDROXY ESTERS
Joseph B. Mettalia, Jr., Southampton, and Edward H. Specht, Huntingdon Valley, Pa., assignors to Rohm & Haas Company, Philadelphia, Pa., a corporation of Delaware
No Drawing. Filed Jan. 25, 1966, Ser. No. 522,836
10 Claims. (Cl. 260—484)

ABSTRACT OF THE DISCLOSURE

A process for preparing alkyl 7-hydroxy-2,5-heptadienoates by reacting butadiene monoxide, acetylene, nickel carbonyl, an alkanol of 1 to 8 carbon atoms and an acid that in the reaction system forms a salt with nickel carbonyl that establishes a buffered system.

---

This invention deals with a method for producing hydroxy esters. It further deals with a method for producing hydroxy esters in a continuous manner with high yields of product.

The present process involves a reaction employing butadiene monoxide, acetylene, nickel carbonyl, a defined alkanol and a defined acid. In its preferred embodiment, with a view to highest yields, one also employs a defined halide.

The hydroxy esters produced by the process of the present invention are the alkyl 7-hydroxy-2,5-heptadienoates, the alkyl portion depending directly on the alkanol employed in the reaction. These esters have known utilities, for instance, to form polyesters and polyamides, which are useful as films or fibers. They may also be hydrogenated to form the corresponding saturated ester or further reacted under circumstances similar to the present process to form dialkyl 2,5,8-decatriene-1,10-dioates which have known utilities, particularly in the fiber field, such as for garments, tires and others.

Many attempts have been made in the prior art to produce the hydroxy esters prepared by the present invention. Various degrees of success have been reported but all previous attempts have been plagued by substantial competing reactions which inevitably lead to large amounts of undesired side products. By rigidly adhering to the teachings of the present invention, one consistently achieves good yields of desired product.

The alkanols used in the present process are those containing from 1 to 8 carbon atoms and may be straight or branched chain in any of the known spatial configurations. It is preferred to use the lower alkanols, such as from 1 to 4 carbon atoms and especially methanol. Typically, there may be employed methanol, ethanol, isopropanol, butanol, hexanol, 2-ethylhexanol, octanol and the like.

The acid employed during the course of the reaction is believed to react with the nickel carbonyl to form a salt with the release of carbon monoxide. The acids to be employed are those that, after reaction with the nickel carbonyl, would form a salt that establishes a buffered system, which thereby resists substantial changes in pH. Typically, such acids include acetic, benzoic, fumaric, carbonic, acrylic, methacrylic, phosphoric and the like. Preferred in this respect is acetic acid. The use of strong mineral acids, such as hydrochloric acid, leads to competing reactions that severely reduce yields of desired product and, therefore, is to be avoided.

The acid is employed in amounts corresponding to about 0.1 to 1.0 mole of acid per mole of butadiene monoxide, preferably 0.1 to 0.3 mole of acid per mole of butadiene monoxide. The acid is frequently employed to maintain a pH of about 5 to 8 when evaluated potentiometrically, according to known techniques.

The halides that are employed in the preferred embodiment of this invention are strictly limited to lithium bromide, lithium chloride, lithium iodide, sodium bromide, sodium iodide and the bromides, chlorides and iodides of the alkaline earth metals, i.e., barium, strontium and calcium. Preferred embodiments include lithium chloride, lithium bromide, sodium bromide, calcium chloride, barium chloride and strontium chloride. One must adhere strictly to these halides in order that solubility conditions are satisfactory and reaction yields advantageous. As stated before, while the use of a halide is not absolutely necessary, one of the defined halides must be employed in order to achieve maximum yields. In this respect, yields of the present process, based on the butadiene monoxide employed, consistently range from 40 to 80%. Yields from 60 to 80% are obtained when halides are employed.

The above-defined halide is employed in the amount of up to about 1 mole per mole of butadiene monoxide; preferred is the range of about 0.1 to 0.5 mole of halide per mole of butadiene monoxide.

The butadiene monoxide concentration ranges from about 0.024 mole to 0.5 mole per mole of the alkanol employed; preferred is a range of 0.1 to 0.4.

The nickel carbonyl is used in amounts of about 0.05 to 0.5 mole per mole of the butadiene monoxide employed. Preferred is the range of about 0.05 to 0.125 mole of nickel carbonyl per mole of butadiene monoxide.

In many instances, carbon monoxide gas, in addition to the carbon monoxide supplied by the nickel carbonyl, is advantageously added to the reaction system. In such instances, there may be employed amounts up to about 0.8, preferably 0.5 to 0.75 mole of carbon monoxide per mole of butadiene monoxide.

Acetylene is generally employed in substantially stoichiometric amounts, such as about 0.8 to 1.2 moles per mole of butadiene monoxide, for best results. More or less acetylene, of course, may be used but such is not commercially attractive.

In the above overall reaction, it has been observed that some relatively minor amount of reaction occurs in the absence of both the defined acid and halide or with halide in the absence of the acid. However, both lead to minimal and commercially unattractive results, as indicated in Runs 1 and 7 in the table that follows. Also, the use of an acid frequently employed in nickel carbonyl reactions but outside of the scope of the present invention leads to similar minimal effects, as shown in Run 5 of the same table.

At the conclusion of the reaction, the product is isolated by stripping unused, volatile reactants and extracting the remainder with a suitable extractant, such as diethyl ether and water. The product is found in the ether layer, which may then be isolated by standard distillation techniques, preferably under reduced pressure.

The present process may be more fully understood from the following examples, which are offered by way of illustration and not by way of limitation.

EXAMPLE 1

A solution of 21 grams of lithium chloride (0.5 mole) in 300 cc. of anhydrous methanol was charged to a one-liter continuous flow stirred tank reactor. The reactor was flushed with nitrogen and then acetylene was fed at 0.25 mole per hour, butadiene monoxide at 0.5 mole per hour, nickel carbonyl at 0.15 mole per hour and acetic acid at 0.125 mole per hour. Temperature was maintained at 45° C, after initiation of reaction had occurred, as evidenced by the appearance of a reddish color and an exotherm.

The temperature was reduced to 35° C. and the following feed rates were maintained:

Butadiene monoxide at 0.5 mole per hour,

EXAMPLE 3

Experiments performed in the same manner as described in Examples 1 and 2 gave the following results:

TABLE

| Run No. | 1 | 2 | 3 | 4 | 5 | 6 | 7 | 8 |
|---|---|---|---|---|---|---|---|---|
| Feed Rates (Moles per Hour): | | | | | | | | |
| Butadiene monoxide | 0.48 | 0.935 | 0.52 | 3.04 | 0.50 | 0.50 | 0.50 | 0.50 |
| Nickel carbonyl | 0.14 | 0.275 | 0.046 | 0.36 | 0.20 | 0.20 | 0.20 | 0.15 |
| Acid | None | [1]0.315 | [1]0.0625 | [1]0.626 | [2]0.20 | [1]0.20 | None | [3]0.20 |
| Lithium chloride | 0.50 | 0.50 | 0.50 | 0.785 | None | None | [4] | [5]0.10 |
| Acetylene | 0.60 | 1.10 | 0.52 | 3.12 | 0.67 | 0.57 | 0.50 | 0.55 |
| Carbon monoxide | 0.125 | 0.60 | 0.35 | 1.80 | 0.11 | 0.11 | 0.125 | 0.10 |
| Methanol | 21.0 | 15.6 | 17.0 | 13.0 | 17.0 | 15.0 | 15.0 | 15.0 |
| Temperature (° C.) | 50 | 45 | 48 | 45 | 50 | 50 | 45 | 45 |
| Product: | | | | | | | | |
| Moles Ni++ produced per hour | 0.018 | 0.10 | 0.027 | 0.264 | | | | |
| Moles methyl acrylate produced per hour | 0 | 0.073 | 0 | 0 | 0 | 0 | 0 | 0 |
| Residual acid moles per hour | | 0.128 | 0 | 0 | | | | |
| Percent yield of methyl 7-hydroxy-2,5-heptadienoate based on: | | | | | | | | |
| Butadiene monoxide | 4.5 | 62.0 | 73.0 | 70.5 | 8.8 | 41.0 | 8.8 | 40.0 |
| Acetylene | 4.1 | 56.0 | 73.0 | 70.0 | 10.0 | 42.0 | 7.9 | 42.0 |

[1] Acetic. [2] HCl. [3] Benzoic. [4] No halide used. [5] CaCl₂.

NOTE.—Similar results are obtained in Runs 2, 3 and 4 when sodium iodide or barium bromide is used with phosphoric acid.

Nickel carbonyl at 0.078 mole per hour,

Acetic acid at 0.0935 mole per hour (the acid level was determined by potentiometric titration of periodic samples of effluent and the acid feed was regulated to maintain the slightest possible acidity in the system), Lithium chloride at 0.52 mole per hour, Acetylene at 0.52 mole per hour, Carbon monoxide at 0.25 mole per hour and Methanol at 17 moles per hour.

After four turnovers in reactor volume, the contents of the reactor were worked up. Nickel carbonyl and methanol were stripped off under reduced pressure. The residue was extratced with diethyl ether and water. The ether layer was dried with anhydrous sodium sulfate, filtered and distilled under reduced pressure to give methyl 7-hydroxy-2,5-heptadienoate in 76.5% yield based on butadiene monoxide.

Infrared spectrum (liquid smear): strong bands at 3350 cm.$^{-1}$, 1720 cm.$^{-1}$, 1640 cm.$^{-1}$, 1438 cm.$^{-1}$, 1400 cm.$^{-1}$, 995 cm.$^{-1}$, 968 cm$^{-1}$ and 818 cm.$^{-1}$.

Boiling point: 0.5 mm.=90° to 98° C., $n_D^{20}$=1.4904.

Analysis.—Calcd. for $C_8H_{12}O_3$: C, 61.52%, H, 7.75% and O, 30.73%. Found: C, 61.98%, H, 7.74% and O, 30.26%.

The product was hydrogenated using Raney nickel at 100° to 150° C., 1000 p.s.i.g. to give methyl 7-hydroxyheptanoate.

Boiling point: 0.5 mm.=95° to 100° C., $n_D^{20}$=1.4410.

Analysis.—Calc'd for $C_8H_{16}O_3$: C, 59.97%, H, 10.07% and O, 29.96%. Found: C, 60.13%, H, 9.80% and O, 29.51%.

EXAMPLE 2

A solution of 20.6 grams of sodium bromide (0.2 mole) and 2 grams of water in 300 cc. anhydrous methanol was charged to the reactor. Carbon dioxide was fed at a rate of 0.1 mole per hour, acetylene at 0.25 mole per hour, butadiene monoxide at 0.5 mole per hour and nickel carbonyl at 0.15 mole per hour. Temperature of the reaction system was maintained at 45° to 50° C. After the reaction was initiated, the following feed rates were maintained:

Butadiene monoxide at 0.53 mole per hour,
Nickel carbonyl at 0.16 mole per hour,
Carbon dioxide at 0.1 mole per hour,
Water at 0.2 mole per hour,
Sodium bromide at 0.2 mole per hour,
Acetylene at 0.6 mole per hour,
Carbon monoxide at 0.3 mole per hour and
Methanol at 20.4 moles per hour.

After five reactor volume turnovers, the product was worked up, as described previously, to give a 61% yield of methyl 7-hydroxy-2,5-heptadienoate based on butadiene monoxide.

EXAMPLE 4

Butadiene monoxide (0.5 mole per hour) was converted to methyl 7-hydroxy-2,5-heptadienoate in the manner described in Example 1. The effluent from the reactor was then fed continuously to a second one-liter continuous stirred tank reactor into which feeds of HCl (gas) (0.1 mole per hour), carbon monoxide (0.25 mole per hour), acetylene (0.5 mole per hour) and nickel carbonyl (0.05 mole per hour) were maintained. The temperature was held at 45° C. The effluent from the second reactor was then stripped of methanol and Ni(CO)₄ and the residue extracted with diethyl ether and distilled under reduced pressure to give, in 60% yield based on butadiene monoxide, dimethyl 2,5,8-decatriene-1,10-dioate.

The infrared spectrum (liquid smear) exhibited strong bands at 1715 to 1730 cm.$^{-1}$, 1640 cm.$^{-1}$, 1435 cm.$^{-1}$, 1400 cm.$^{-1}$, 968 cm.$^{-1}$ and 815 cm.$^{-1}$. The ultraviolet spectrum was devoid of bands above 212 m$\mu$.

Boiling point: 0.1 mm.=96° C., $n_D^{20}$=1.4896.

Analysis.—Calc'd for $C_{12}H_{16}O_4$: C, 64.27%, H, 7.19% and O, 28.54%. Found: C, 64.30%, H, 7.22% and O, 28.91%.

The compound was hydrogenated with $PtO_2$ at 900 p.s.i.g. at 25° C. and then distilled to give dimethyl sebacate, boiling point: 0.08 mm.=100° C. Infrared spectrum was identical with known dimethyl sebacate. Saponification of the sample gave a solid which, after recrystallization from water, had a melting point=133° to 135° C. and which did not depress the melting point of known sebacic acid.

We claim:

1. A process for the preparation of alkyl 7-hydroxy-2,5-heptadienoates, in which the alkyl contains from 1 to 8 carbon atoms, comprising reacting butadiene monoxide, acetylene, nickel carbonyl, an alkanol of 1 to 8 carbon atoms and an acid, other than a strong mineral acid, that in the reaction system forms a salt with nickel carbonyl that establishes a buffered system, in which there are employed:

about 0.024 to 0.5 mole of said butadiene monoxide per mole of said alkanol;

about 0.05 to 0.5 mole of said nickel carbonyl per mole of said butadiene monoxide;

about 0.1 to 1.0 mole of said acid per mole of said butadiene monoxide.

2. A process according to claim 1 wherein there are employed:

about 0.1 to 0.4 mole of said butadiene monoxide per mole of said alkanol;

about 0.05 to 0.125 mole of said nickel carbonyl per mole of said butadiene monoxide;

about 0.1 to 0.3 mole of said acid per mole of said butadiene monoxide.

3. A process according to claim 1 wherein there is employed at least one of lithium bromide, lithium chloride, lithium iodide, sodium bromide, sodium iodide or the bromide, chloride or iodide of barium, strontium or calcium wherein said halide is employed in the amount of up to about 1 mole per mole of said butadiene monoxide.

4. A process according to claim 3 wherein there are employed:
about 0.1 to 0.4 mole of said butadiene monoxide per mole of said alkanol;
about 0.05 to 0.125 mole of said nickel carbonyl per mole of said butadiene monoxide;
about 0.1 to 0.3 mole of said acid per mole of said butadiene monoxide.

5. A process according to claim 3 wherein there is employed carbon monoxide gas in amounts up to about 0.8 mole per mole of said butadiene monoxide.

6. A process according to claim 5 wherein there are employed:
about 0.1 to 0.4 mole of said butadiene monoxide per mole of said alkanol;
about 0.05 to 0.125 mole of said nickel carbonyl per mole of said butadiene monoxide;
about 0.1 to 0.3 mole of said acid per mole of said butadiene monoxide.

7. A process according to claim 1 wherein said acid is acetic acid and said alkanol is methanol.

8. A process according to claim 3 wherein said acid is acetic acid, said alkanol is methanol and said halide is lithium chloride.

9. A process according to claim 1 wherein said acid is selected from the group consisting of acetic acid, benzoic acid, fumaric acid, carbonic acid, acrylic acid, methacrylic acid, and phosphoric acid.

10. A process according to claim 1 wherein said acid is acetic acid.

References Cited

UNITED STATES PATENTS

| | | | |
|---|---|---|---|
| 2,613,222 | 10/1952 | Specht et al. | 260—533 |
| 3,028,417 | 4/1962 | Eisenmann | 260—484 |
| 3,238,246 | 3/1966 | Chiusoli et al. | 260—486 |
| 3,312,731 | 4/1967 | Chiusoli et al. | 260—485 |

LORRAINE A. WEINBERGER, *Primary Examiner.*

A. P. HALLUIN, *Assistant Examiner.*